July 18, 1950 J. MAHLER 2,515,830
APPARATUS FOR STRETCHING SHEET MATERIAL
Filed Oct. 19, 1946 2 Sheets-Sheet 2
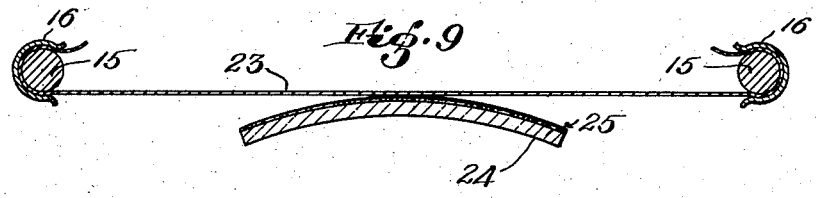
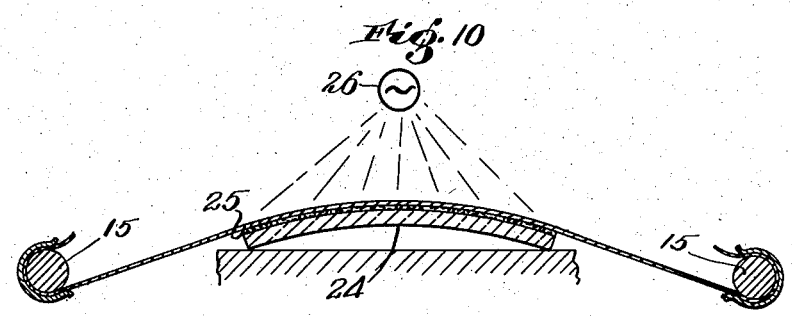
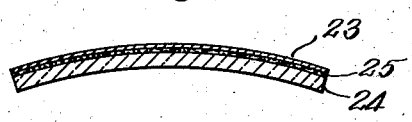
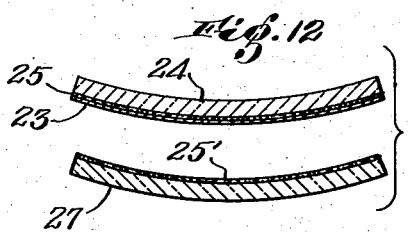

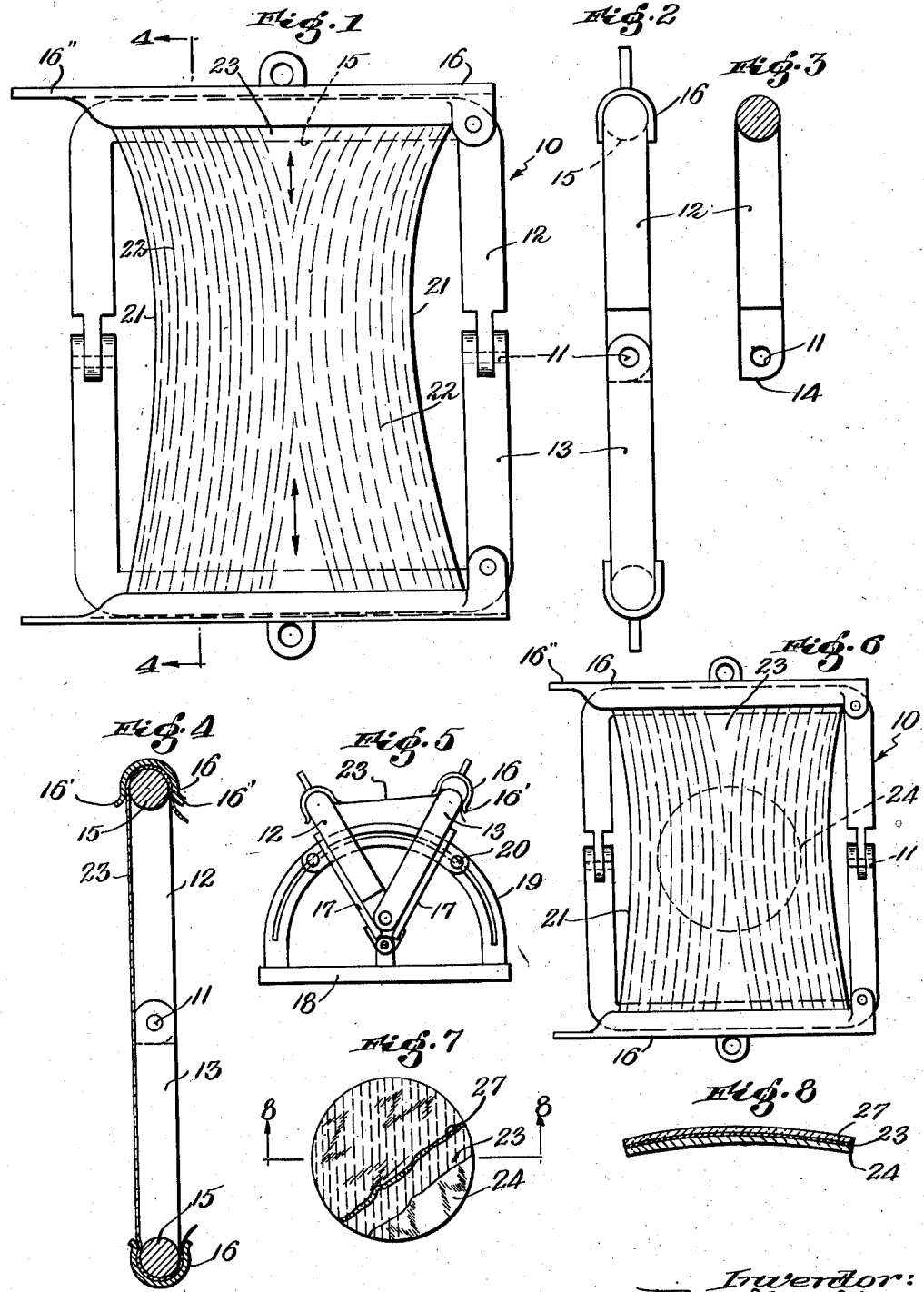

Patented July 18, 1950

2,515,830

UNITED STATES PATENT OFFICE 2,515,830

APPARATUS FOR STRETCHING SHEET MATERIAL

Joseph Mahler, Brookline, Mass., assignor to American Optical Company, Southbridge, Mass., a voluntary association of Massachusetts Application October 19, 1946, Serial No. 704,413

4 Claims. (Cl. 18—19)

This invention relates to apparatus for making light polarizers and more especially to a curvilinear polarizer capable of lamination to a curved surface, such as an optical lens.

It is now well known that the molecules of certain groups of plastics, such as cellophane and polyvinyl alcohol, can be oriented into parallelism and, when such plastics so treated are stained with a polarizing dye, for example, a dichroic dye, a light polarizer is formed. The plastics aforesaid cannot be stretched to effect the orientation of the molecules thereof until they have been softened by heating. When a sheet of plastic is softened by heating and then stretched to secure the desired orientation of its molecules, the plastic is likely to split in the direction in which it is stretched, which, of course, is the direction of the orientation of its molecules. For this reason, it is impossible to laminate such material to curved surfaces; in fact, the lamination thereof to flat surfaces is difficult and is successful only when great care is used.

In order to handle a film which has been stretched after heating, it is necessary to secure it to a film base, such as cellulose acetate or the like. A polarized film anchored to a base film cannot be laminated to a curved lens or between two curved lenses because the base, being stiff, does not readily assume the curvature of the lens or lenses or adhere thereto.

Another difficulty preventing the lamination of a polarizer having its molecules oriented in linear parallelism to a curved lens or between curved lenses is that a substantial distortion of the polarizer will result when it is forced out of its original plane surface to assume the configuration of the lens.

When a sheet of such plastics has been softened by heat and stretched to orient the molecules thereof, the surface of the film is hardened to such an extent that a dichroic dye cannot readily penetrate the surface thereof and if the time of treatment is extended in order to secure the necessary penetration, the distribution of the dye is not uniform even in small areas.

It is highly desirable that a polarized sun glass, if used by one whose vision is defective, should comprise optical glass lenses ground in accordance with the lenses of the spectacles worn by such user. If the user does not have defective vision requiring correction by spectacles, it is desirable that the polarized film of his sun glasses should be laminated to a curvilinear surface for the reason that when the polarizer is laminated to a plane surface, the glasses form a mirror which reflects into the user's eyes, light impinging upon the rearward surface of the glasses.

It is therefore one of the objects of my invention to provide an apparatus for making a curvilinear polarizer having such qualities that it is capable of lamination to a curvilinear surface without splitting.

Another object is to provide an apparatus for making a lamination or sheet of polarized material having its molecules oriented curvilinearly, that is to say, one having its molecules oriented on both sides of its longitudinal axis, the orientation on each of the sides of the sheet being convex to that of the other.

Another object is to provide a simple and effective device for stretching a sheet of plastic to orient the molecules thereof.

Other objects of my invention will appear from the detailed description of the particular embodiments thereof selected to explain the principles underlying the same.

In the drawings:

Figure 1 is a plan view of one form of device that may be used for stretching a film to orient the molecules thereof.

Fig. 2 is a side view of the same.

Fig. 3 is a side view partly in section of the upper side of said device.

Fig. 4 is a section taken on the line 4—4 of Fig. 1.

Fig. 5 is an elevation of one form of gauge that may be used with the stretching device.

Fig. 6 is a plan view on a smaller scale indicating a curvilinearly polarized film and the curvilinear lens to which it is to be laminated.

Fig. 7 is a plan view of two curvilinear lenses having a polarized film laminated thereto.

Fig. 8 is a section on the line 8—8 of Fig. 7.

Figs. 9, 10, 11, and 12, are diagrams illustrating the several stages in the lamination of my polarizer between two curvilinear lenses.

I have found that when a sheet of polyvinyl alcohol or cellophane, each of which is water soluble, is treated with a suitable reagent in the manner hereinafter set forth, the physical characteristics of such sheet are so altered that the sheet is of low water solubility, in fact, practically water insoluble, has high flexibility when in moistened condition, is readily stretchable at "room" temperatures, (20° C.), or even at as low as 1° C., to orient its molecules and is capable of application to a curved surface, assuming the shape thereof without splitting in the direction of orientation and that said sheet, if stained with a dichroic or other suitable dye, becomes an efficient polarizer.

It is to be understood, however, that I do not limit myself to the plastics above named.

I have found that suitable reagents for treating a sheet of polyvinyl alcohol are solutions of alkali metal salts, such, for example, as a solution of sodium sulphate having a concentration of about 100 grams per liter of water or a solution of sodium phosphate (monobasic) or potassium phosphate (monobasic) of about the same concentration. While sodium sulphate (monobasic), sodium phosphate (monobasic) and sodium sulphate work particularly well, it is to be understood that my invention is not limited specifically to the use of these reagents, for resorcinol may also be used with good results.

The time of treatment of the sheet depends upon its thickness and the temperature of the bath, for example, for a sheet of plastic having a thickness of about .003 inch, and a bath temperature of about 1° C., the time of treatment will be about three minutes and if the temperature of the bath is about 20° C., such time will be about one minute.

If the plastic to be treated is cellophane, I prefer a caustic alkaline hydroxide, such, for example, as sodium hydroxide or potassium hydroxide, and such sheet so treated will have substantially the same characteristics as those above set forth with respect to polyvinyl alcohol.

A sheet of either of the materials treated as above will readily accept a dichroic or other suitable dye which will almost instantaneously distribute itself uniformly into the plastic after the molecules thereof have been oriented, thereby making a polarizer of the proper density and shade.

While at the present time I prefer sodium sulphate as a reagent for giving polyvinyl alcohol the properties outlined above, it is to be understood that sodium sulphate and potassium phosphate (monobasic) are full chemical equivalents, producing products which aside from their differences in degree of water solubility and acidity are full chemical equivalents and that sodium phosphate is the chemical equivalent of potassium phosphate, for this purpose.

When the molecules of the substances above described are oriented curvilinearly, there will be two sets of such oriented molecules, one on either side of the axis of stretch of the film; that is to say, the central longitudinal axis, if, as shown in Fig. 1, the film is stretched longitudinally, as indicated by the arrow, and the orientation on one of the sides of the film will be convex to that of the other.

I consider as embraced within the scope of my invention all other plastics which when treated with suitable reagents will be of low water solubility, high flexibility when in moistened condition, stretchable at a temperature as low as 1° C., or lower, for curvilinearly orienting their molecules in the manner above stated, and capable of lamination to a curvilinear surface and assuming the shape thereof without splitting in the direction of orientation.

There is shown in Fig. 1, a stretcher which I have found convenient for orienting the molecules of plastic sheets treated as above set forth. The stretcher comprises two flattened U-shaped members 10 hinged together in any suitable manner, as indicated at 11. In the present instance, the flattened lower ends of the side members 12 take into the bifurcated upper ends of the sides 13, and preferably, as indicated at 14, the conformation of the lower ends of said flattened portions is such that the two U-shaped members can be rotated to lie in the same plane, or only slightly beyond such plane. Pivoted to each of the cross bars 15, which may be four inches long, near one end thereof, is a clamp 16, comprising an arcuate clip of spring material of substantially the same length as the cross bars and constructed to embrace and snap over the latter to securely hold the ends of the sheet to be treated to the cross bars. Each said clip has a circumferential length slightly greater than 180°, and the outer edges thereof are flared outwardly, as shown at 16'. The free edge of each clip terminates in a finger piece 16" extending beyond the cross bars.

Any suitable holder may be employed to retain the stretcher in semi-closed position, preparatory to clamping the ends of a sheet of plastic to the cross bars. In Fig. 5, I have shown such holder comprising the plates 17, which are pivoted to a bracket rising from the base 18. The angle between the plates which, of course, governs the angle between the side members of the stretcher having been determined, the plates may be clamped to the semi-circular guide 19 by screws 20. Having determined the degree of stretch of the film, the plates are set at the proper angle and the stretcher disposed in the holder between them, as indicated in Fig. 5. The ends of the film are now placed over the bars 15 and firmly clamped thereto by the clips 16, one of which, in Fig. 5, is shown in open position. By way of example, the length of the film 23 before stretching may be one inch. The stretcher will now be removed from the holder and immersed in the chemical bath above specified, and after remaining there the proper length of time, the side members of the stretcher will be rotated about their pivot until the two U-shaped members lie in the same plane.

The degree of stretch, that is, the ratio of the length of the plastic sheet after stretching to its original length is subject to the widest latitude. I have found that a suitable curvilinearly oriented sheet may be obtained if the length of the stretcher when in open position (Fig. 1) is five inches and the original length of the plastic sheet (Fig. 5) is one inch. It is to be understood, however, that this example is merely illustrative and not restrictive.

As indicated by the lines 21, 21, the width of the film will be progressively reduced from its respective ends to its central portion. The direction of orientation of its molecules will be curvilinear, as indicated by the broken lines 22. The sheet, which is now extremely flexible, will be bonded to the convex surface of a lens, such as that shown at 24, a suitable adhesive or bonding material 25 having first been placed on said surface of the lens.

This may, preferably, be done by grasping the ends of the stretcher and placing the central portion of the surface of the film against the convex surface of said lens (Fig. 9) and then forcing the film down over said convex surface (Figs. 6 and 10). Thereafter, by an infra red heat lamp 26, or other suitable heating means, the film and bonding material are quickly dried. The film is then removed from the frame and the portions extending beyond the periphery of the lens are trimmed off. A coating of bonding material 25' is now placed over the concave surface of the other lens 27 and the lens 24 with the film bonded thereto is pressed firmly down on the concave surface of the lens 27 (Fig. 12) thereby forming the laminated curvilinearly polarized lens shown in Figs. 7 and 8.

As indicated in Fig. 7, the curvilinear orientation obtained when the surface of the film is planary will be changed to a parallel orientation when the film is laminated to a curvilinear surface. All optical blanks are made in a standard form with spherical surfaces and have a fixed radius of curvature. Therefore, one can readily ascertain the length of the stretcher that will give a film of suitable width a curvilinear orientation of the type herein shown that will be transformed into an orientation in parallelism when the surface of said film is changed from a plane to a spherical surface of known radius of curvature. For example, I have ascertained in practice that when a film of the plastics named above having a width of four inches is stretched on a frame five inches in length, the orientation of the molecules will be in parallelism when such film is laminated to the standard optical blank.

Having thus described illustrative embodiments of my invention without, however, limiting the same thereto, what I claim and desire to secure by Letters Patent is:

1. An apparatus for stretching sheets of moistened plastic without the application of heat to orient the molecules thereof, comprising in combination, a frame having two oppositely disposed flattened U-shaped members, each having two parallel side portions connected by a cross bar, each of said side portions having an inner end juxtaposed with the inner end of a side portion of the other U-shaped member means for pivotally connecting the juxtaposed inner ends of said side portions independently of the other pair of juxtaposed inner ends so as to produce an open unobstructed area inwardly of the U-shaped members, and a spring clip pivoted to the cross bars of each of said U-shaped members near one end thereof, each clip being coterminous with its co-operating cross bar and disposed to snap over the same so as to have area contact with the sheet material.

2. An apparatus as defined in claim 1, wherein the edges of said spring clips are flared outwardly.

3. An apparatus as defined in claim 1, wherein the free end of each clip terminates in a finger piece extending beyond the U-shaped member with which it co-operates.

4. An apparatus for stretching sheets of plastic to orient the molecules thereof comprising in combination a frame having two oppositely disposed U-shaped members each having two spaced side portions connected by a cross bar, each of said side portions having an inner end juxtaposed with the inner end of a respective side portion of the other U-shaped member, means for pivotally connecting the respective juxtaposed inner ends of said side portions independently of each other so as to produce an open unobstructed area inwardly of the U-shaped members, and clip means carried by the respective cross bars and extending throughout the major portion of the length of said cross-bars, said clip means being of a channelled cross-sectional shape whereby the cooperating cross bar will interfit therewith and assume a tight gripping relations with the sheet material over a relatively wide area of contact.

JOSEPH MAHLER.

REFERENCES CITED

The following references are of record in the file of this patent:

UNITED STATES PATENTS

| Number | Name | Date |
| --- | --- | --- |
| 480,199 | MacDonald | Aug. 2, 1892 |
| 546,492 | Millert | Sept. 17, 1895 |
| 2,011,553 | Land | Aug. 13, 1935 |
| 2,041,138 | Land | May 19, 1936 |
| 2,078,254 | Land | Apr. 27, 1937 |
| 2,287,546 | Binda | June 23, 1942 |
| 2,320,375 | Moulton | June 1, 1943 |
| 2,328,827 | Martin | Sept. 7, 1943 |